US009967811B2

(12) United States Patent
Ren et al.

(10) Patent No.: US 9,967,811 B2
(45) Date of Patent: May 8, 2018

(54) METHOD AND DEVICE FOR DISPLAYING WIFI LIST

(71) Applicant: Xiaomi Inc., Beijing (CN)

(72) Inventors: Qiao Ren, Beijing (CN); Enxing Hou, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 114 days.

(21) Appl. No.: 15/058,587

(22) Filed: Mar. 2, 2016

(65) Prior Publication Data

US 2016/0262093 A1 Sep. 8, 2016

(30) Foreign Application Priority Data

Mar. 4, 2015 (CN) .......................... 2015 1 0097050

(51) Int. Cl.
*H04W 48/16* (2009.01)
*H04W 8/00* (2009.01)
*H04W 48/10* (2009.01)

(52) U.S. Cl.
CPC ........... *H04W 48/16* (2013.01); *H04W 8/005* (2013.01); *H04W 48/10* (2013.01)

(58) Field of Classification Search
CPC ...... H04W 48/10; H04W 48/16; H04W 8/005
See application file for complete search history.

(56) References Cited

U.S. PATENT DOCUMENTS

| 8,706,084 B2 | 4/2014 | Qiang |
| 2010/0267384 A1 | 10/2010 | Dwyer et al. |
| 2012/0322412 A1 | 12/2012 | Qiang |
| 2013/0148149 A1* | 6/2013 | Park ..................... G06F 3/1296 358/1.13 |
| 2014/0177615 A1 | 6/2014 | Kim et al. |
| 2014/0364060 A1 | 12/2014 | Srivatsa et al. |

FOREIGN PATENT DOCUMENTS

| CN | 101945456 A | 1/2011 |
| CN | 101990279 A | 3/2011 |
| CN | 104684048 A | 6/2015 |
| JP | 2007088727 A | 4/2007 |
| JP | 2012190130 A | 10/2012 |
| JP | 2013530629 A | 7/2013 |
| JP | 2014179719 A | 9/2014 |
| JP | 2014241487 A | 12/2014 |

(Continued)

OTHER PUBLICATIONS

International Search Report (including English translation) and Written Opinion issued in corresponding International Application No. PCT/CN2015/088684, dated Dec. 4, 2015, 14 pages.

(Continued)

*Primary Examiner* — David Oveissi

(57) ABSTRACT

Methods and devices are provided for displaying a WIFI list. In the method, the device obtains WIFI types supported by a WIFI smart device. The device classifies WIFI networks to be accessed by the WIFI smart device into at least an accessible group and an inaccessible group according to the WIFI types supported by the WIFI smart device. The device then displays in the WIFI list the WIFI networks classified.

19 Claims, 9 Drawing Sheets

(56) References Cited

FOREIGN PATENT DOCUMENTS

WO    2010120314  A1    10/2010

OTHER PUBLICATIONS

Extended European Search Report issued in corresponding EP Application No. 16158531, dated Jul. 27, 2016, 11 pages.
Notification of Reason for Refusal (including English translation) issued in corresponding Korean Patent Application No. 10-2016-7013441, dated Jan. 16, 2017, 7 pages.
Communication issued in corresponding European Patent Application No. 16158531, dated May 31, 2017, 9 pages.
Notification of Office Action (including English translation) issued in corresponding Japanese Patent Application No. 2016-522108, dated Jun. 9, 2017, 8 pages.
Notice of Final Rejection (including English translation) issued in corresponding Korean Patent Application No. 10-2016-7013441, dated Jul. 24, 2017, 6 pages.
Ian Paul, "Wi-Fi Direct vs. Bluetooth 4.0: A Battle for Supremacy: PCWorld," PC World Web: http://www.pcworld.com/article/208778/Wi_Fi_Direct_vs_Bluetooth_4_0_A_Battle_for_Supremacy.html, Oct. 26, 2010, 5 pages.
Wi-Fi Alliance: "WiFi Certified Wi-Fi Direct," Wi-Fi Alliance Web: http://www.wi-fi.org/knowledge-center/white-papers/wi-fi-certified-wi-fi-direct%E2%84%A2-personal-portable-wi-fi%C2%AE-connect-devices, Oct. 1, 2010, pp. 1-14.

* cited by examiner

METHOD AND DEVICE FOR DISPLAYING WIFI LIST

This application is based on and claims priority to Chinese Patent Application No. 201510097050.0, filed on Mar. 4, 2015, the entire contents of which are incorporated herein by reference.

TECHNICAL FIELD

The present disclosure generally relates to the communication technology field, and more particularly, to a method and a device for displaying a WIFI list.

BACKGROUND

Generally, only when WIFI smart devices successfully access networks, they can receive control instructions sent by users via mobile phones and execute corresponding operations. However, the smart devices usually use different types of WIFI smart chips, and different types of WIFI smart chips support different types of WIFI networks due to different standards, and thus it is important to ensure that the WIFI smart device can access the WIFI network successfully.

SUMMARY

In order to overcome problems existing in the related art, the present disclosure provides a method and a device for displaying a WIFI list.

According to a first aspect of the present disclosure, a method for displaying a WIFI list is provided. In the method, the terminal obtains WIFI types supported by a WIFI smart device. The terminal classifies WIFI networks to be accessed by the WIFI smart device into at least an accessible group and an inaccessible group according to the WIFI types supported by the WIFI smart device. The terminal displays in the WIFI list the WIFI networks classified.

According to a second aspect of the present disclosure, a device for displaying a WIFI list is provided, and the device includes: an obtaining module, configured to obtain WIFI types supported by a WIFI smart device; a classifying module, configured to classify WIFI networks to be accessed by the WIFI smart device into at least an accessible group and an inaccessible group according to the WIFI types supported by the WIFI smart device; and a displaying module, configured to display in the WIFI list the WIFI networks classified.

According to a third aspect of the present disclosure, a device for displaying a WIFI list is provided, and the device includes a processor and a memory configured to store instructions executable by the processor. The processor is configured to: obtain WIFI types supported by a WIFI smart device; classify WIFI networks to be accessed by the WIFI smart device into at least an accessible group and an inaccessible group according to the WIFI types supported by the WIFI smart device; display in the WIFI list the WIFI networks classified.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
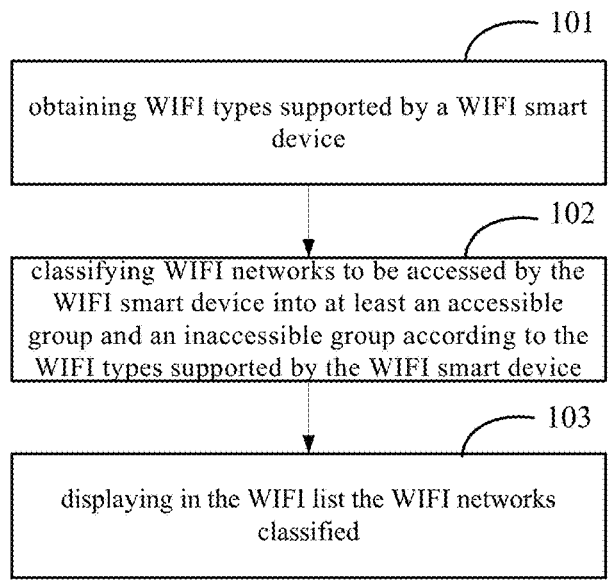
FIG. 1 is a flow chart of a method for displaying a WIFI list according to an exemplary embodiment.

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

It should be appreciated that, although terms such as first, second and third are used in the present disclosure for describing various information, the information are not limited to these terms. These terms are only used to distinguish the same type of information. For example, without departing from the scope of the present disclosure, the first information may also be referred to as the second information, and similarly, the second information may be referred to as the first information. Depending on the context, the word "if" used herein may be interpreted as "when . . . " or "upon . . . " or "in response to determining . . . "

The present disclosure aims to solve the problem that, the WIFI network with the WIFI type unsupported by the WIFI smart chip is incorrectly specified for the WIFI smart device when the user specifies the WIFI network to be accessed for the WIFI smart device, which causes an access failure of the device and reduces a rate of successful accesses.

The present disclosure provides a method for displaying a WIFI list. WIFI types supported by a WIFI smart device are obtained, WIFI networks to be accessed by the WIFI smart device are classified into at least an accessible group and an inaccessible group according to the WIFI types supported by the WIFI smart device, and the WIFI networks classified are displayed in the WIFI list. Since the WIFI networks to be accessed by the WIFI smart device have already been classified as accessible and inaccessible, when the user specifies the WIFI network to be accessed for the WIFI smart device, the access failure caused by specifying the inaccessible WIFI network for the WIFI smart device may be avoided, thus enhancing the rate of successful accesses of the WIFI smart device.

FIG. 1 is a flow chart of a method for displaying a WIFI list according to an exemplary embodiment, the method for displaying the WIFI list may be implemented in a terminal. The terminal may include a smart phone, a tablet, a laptop computer, a virtual reality device, or any electronic device including a processor. As shown in FIG. 1, the method includes following steps.

In step 101, WIFI types supported by a WIFI smart device are obtained. For example, the terminal may obtain the WIFI types supported by the WIFI smart device in a WIFI broadcast message sent from the WIFI smart device.

In step 102, WIFI networks to be accessed by the WIFI smart device are classified into at least an accessible group and an inaccessible group according to the WIFI types supported by the WIFI smart device. The terminal may classify the available WIFI networks to be accessed by the WIFI smart device into at least two groups: the accessible group and the inaccessible group. The accessible group may include WIFI networks accessible to the WIFI smart device while the inaccessible group may include WIFI networks inaccessible to the WIFI smart device.

In step 103, the WIFI networks classified are displayed in the WIFI list. The terminal may display the WIFI networks in the classified groups in the WIFI list.

In one or more embodiments, the terminal may be a smart terminal, such as a smart phone, and the WIFI smart device may be a smart home device with a built-in WIFI module. When a user controls the WIFI smart device via the smart terminal, the control may be generally completed via client software installed in the smart terminal. For example, in practice, the client software may be a "smart home" application, and the user may manage and control various smart home devices in home environment centrally via the application.

In the following, the technical solution of the present disclosure is described in detail by taking the smart home application as an example of the client software and with reference to a scenario of the smart home environment.

In the smart home environment, there are generally multiple smart devices. For example, in the smart home environment, there are generally smart home devices such as smart cameras, smart sockets, smart air cleaners, etc. The user may log in to the smart home application through the login account of the user, and establish a binding relationship between the smart home application and the smart devices in the home environment for determining usage permission.

However, since the smart devices in the home environment can be used normally only when they successfully access the network, it is generally required to perform a network configuration on new smart devices in the home environment for specifying the WIFI networks to be accessed by the new smart devices, before establishing the binding relationship with the new smart devices in the home environment by logging in to the smart home application through the login account of the user. After the smart devices successfully access the WIFI networks specified, the user can initiate the binding with the smart devices by operating the smart home application.

It is also possible for the user to perform the network configuration on the new smart devices in the home environment by operating the smart home application, such that the WIFI networks to be accessed are specified for the new smart devices.

In an initial state, the smart device, after being powered on, generally may send a WIFI broadcast message carrying a name of the smart device to surrounding environment via the built-in WIFI module, such that the smart home application may scan for the surrounding smart devices by receiving the broadcast message. The broadcast message may include WIFI compatibility information of the smart device. For example, the smart device may include the WIFI types supported by itself or the WIFI types unsupported by itself in the WIFI broadcast message. Thus, when the smart home application receives the WIFI broadcast message, it may store the WIFI types supported by the smart device or the WIFI types unsupported by the smart device locally in the smart terminal.

In practice, the smart home application may implement scanning for the smart devices via circuitry supporting other communication standards such as the built-in Bluetooth module. For example, after being powered on, the smart device broadcasts a Bluetooth signal to surrounding environment via the built-in Bluetooth module, and the smart home application may scan for the surrounding smart device by detecting the Bluetooth signal sent by the smart device. Meanwhile, the Bluetooth signal sent by the smart device may also include the WIFI types supported by the smart device or the WIFI types unsupported by the smart device. Thus, when the smart home application detects the Bluetooth signal, it may store the WIFI types supported by the smart device or the WIFI types unsupported by the smart device locally.

It should be noted that, the WIFI types supported by the smart device or the WIFI types unsupported by the smart deice depend on the standard of the WIFI smart chip used by the smart device. The WIFI smart chip may be disposed in the smart device. For example, if the WIFI smart chip used by the smart device cannot access the WIFI network which does not support the WEP encryption, the enterprise-level WIFI network (router), and the WIFI network running in the 5G frequency band, due to the standard limitation, then these types of WIFI networks unsupported by the smart device are written into a register of the WIFI smart device when the smart device leaves the factory. Thus, after being powered on, the smart device may read the compatibility information from the register and carries the compatibility information in the WIFI broadcast message or the Bluetooth signal sent for broadcasting in the home environment.

In one or more embodiments, in order to make the smart home application obtain the WIFI types supported by the smart device, the smart device actively sends the WIFI types supported by itself or the WIFI types unsupported by itself to the smart home application via the broadcast message after being powered on. Besides, the smart home application may perform an active query. For example, in practice, the smart home application may send a query message to the surrounding smart device for querying the WIFI types supported by the surrounding smart device, and when the surrounding smart device receives the query message, it may read the supported WIFI types or the unsupported WIFI types from the register of the WIFI smart chip and return the read information to the smart home application as a query result.

In practice, the query message may be the WIFI broadcast message sent by the smart home application via the user's smart terminal, or may be the Bluetooth signal sent by the user's smart terminal, which is not limited herein.

In one or more embodiments, if a smart device is scanned for the first time, then the smart terminal may indicate that the smart device is a new smart device in the smart home application. When the smart device has not yet accessed the network, the user may perform the network configuration on the smart device by operating the smart home application for specifying the WIFI network to be accessed for the smart device.

In practice, when one new smart device is scanned by the smart home application for the first time, a prompt box "one smart device is found, and click for connecting with the new device" may be outputted in an interface of the application. When the user clicks an OK button in the prompt box, the smart terminal may display a device connection interface. Certainly, if multiple new smart devices are scanned by the smart home application, a device list may be generated according to the scanned smart devices, and then the user may select in the list the smart device on which the network configuration is to be performed, such that the device connection interface is jumped to.

In the device connection interface, a drop-down list displaying the WIFI networks to be accessed by the smart device may be provided, and the user may specify the WIFI network to be accessed (i.e. SSID) for the smart device in the drop-down list. Since the smart home application has stored the supported WIFI types or the unsupported WIFI types of all the scanned smart devices, the smart home application may classify the WIFI networks to be accessed by the smart device in the drop-down list according to the above information in combination with the practical situation of the WIFI network in the home environment.

The smart home application may classify the WIFI networks in the drop-down list based on an accessible group and an inaccessible group, and classify the WIFI networks in the drop-down list as the WIFI networks accessible to the smart device and the WIFI networks inaccessible to the smart device.

In practice, the smart home application may scan for the surrounding WIFI networks, and obtain the types of the scanned WIFI networks. For example, the smart home application may obtain information such as the frequency band of the scanned WIFI network, whether the scanned WIFI network supports the WEP encryption, whether the WIFI network is the enterprise-level router, etc.

After obtaining the types of the scanned WIFI networks, the smart home application may match the types with the WIFI types supported by the smart device stored locally or with the WIFI types unsupported by the smart device stored locally. If the type of a scanned WIFI network matches with the WIFI types supported by the smart device, the WIFI network may be classified as the WIFI network accessible to the smart device. Similarly, if the type of a scanned WIFI network does not match with the WIFI types supported by the smart device, the WIFI network may be classified as the WIFI network inaccessible to the smart device. Alternatively or additionally, if the type of a scanned WIFI network is one of the WIFI types unsupported by the WIFI smart device, the WIFI network is classified as the WIFI network inaccessible to the WIFI smart device.

Here, the type of a scanned WIFI network matches with a WIFI type supported by the smart device when the smart device supports a standard that is compatible with the scanned WIFI network. The type of a scanned WIFI network is one of the WIFI types unsupported by the WIFI smart device when the WIFI network is not compatible with any standard supported by the WIFI smart device.

For example, if the WIFI types unsupported by the smart device includes the WIFI network which does not support the WEP encryption, the enterprise-level WIFI network (router) and the WIFI network running in the 5G frequency band, and the WIFI network scanned by the smart home application is running in the 5G frequency band, then the WIFI network may be classified as the WIFI network inaccessible to the smart device locally. Similarly, if the type of the scanned WIFI network does not match with any of the WIFI types unsupported by the smart device, then the WIFI network may be classified locally as the WIFI network accessible to the smart device.

In one or more embodiments, since the user only focuses on the WIFI networks accessible to the smart device when specifying the WIFI network to be accessed for the smart device in the drop-down list, the smart home application may mark the WIFI networks determined to be accessible to the smart device in the above matching process when classifying the WIFI networks in the drop-down list. When marking the WIFI networks in the drop-down list, the smart home application may add a special marker to the WIFI network determined to be accessible to the smart device, or highlight the name of the WIFI network determined to be accessible to the smart device, such that the WIFI networks accessible to the smart device are distinguished from the WIFI networks inaccessible to the smart device.

In addition, in order to make the classified WIFI networks in the drop-down list more intuitive, the WIFI networks determined to be accessible to the smart device may be ranked according to a predetermined arrangement and then displayed in the drop-down list in sequence from a beginning of the drop-down list. For example, the WIFI networks accessible to the smart device may be ranked in alphabetical order according to initials of the names of the WIFI networks, and then the ranked WIFI networks accessible to the smart device are displayed to the user from the beginning of the drop-down list. In this way, when the user specifies the WIFI network to be accessed for the smart device, he/she can give priority to the WIFI networks marked as accessible in the list for the smart device, such that the access failure caused by specifying the inaccessible WIFI network for the WIFI smart device may be avoided, and the rate of successful accesses of the WIFI smart device may be enhanced.

In one or more embodiments, a connection button may be provided in the device connection interface. When the user has already specified the WIFI network for the smart device via the drop-down list, the smart home application may push the name and password of the WIFI network stored in the background to the smart device after the user clicks the connection button. After receiving the WIFI name and password pushed by the smart home application, the smart device may initiate a connection to a corresponding wireless router according to the received name and password of the WIFI network. Certainly, if the smart home application does not store the password of the WIFI network in the background, an input box may be outputted in the device connection interface, such that the user may input the WIFI password manually, and the smart home application may push the name of the WIFI network and the WIFI password input by the user to the smart device.

In the above embodiments, the WIFI types supported by the WIFI smart device are obtained, the WIFI networks to be accessed by the WIFI smart device are classified into at least the accessible group and the inaccessible group according to the WIFI types supported by the WIFI smart device, and the WIFI networks classified are displayed in the WIFI list. Since the WIFI networks to be accessed by the WIFI smart device have already been classified as accessible and inaccessible, when the user specifies the WIFI network to be accessed for the WIFI smart device, the access failure caused by specifying the inaccessible WIFI network for the WIFI smart device may be avoided, thus enhancing a rate of successful accesses of the WIFI smart device.

Figure 2:
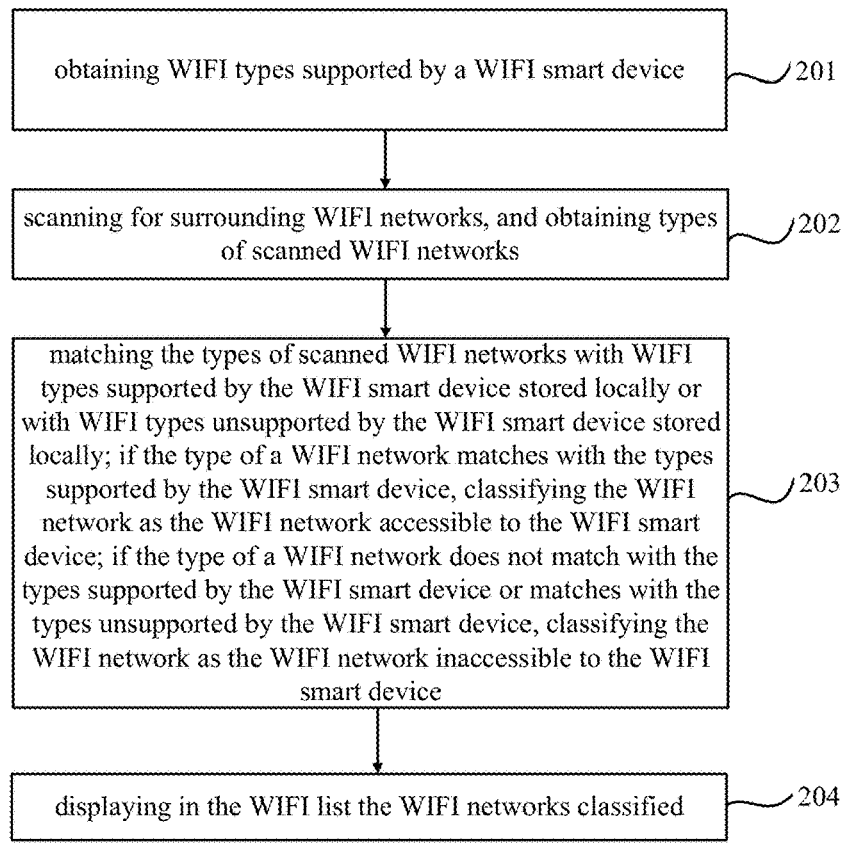
FIG. 2 is a flow chart of another method for displaying a WIFI list according to an exemplary embodiment.

FIG. 2 is a flow chart of a method for displaying a WIFI list according to an exemplary embodiment of the present disclosure, the method is applied in the terminal, and as shown in FIG. 2, the method includes following steps.

In step 201, WIFI types supported by a WIFI smart device are obtained.

In step 202, surrounding WIFI networks are scanned, and types of the scanned WIFI networks are obtained.

In step 203, the types of the scanned WIFI networks are matched with the WIFI types supported by the WIFI smart device stored locally or with the WIFI types unsupported by the WIFI smart device stored locally. If the type of a scanned WIFI network matches with the WIFI types supported by the WIFI smart device, the WIFI network is classified as the WIFI network accessible to the WIFI smart device. If the type of a scanned WIFI network does not match with the WIFI types supported by the WIFI smart device or matches with the WIFI types unsupported by the WIFI smart device, the WIFI network is classified as the WIFI network inaccessible to the WIFI smart device.

In step 204, the classified WIFI networks are displayed in the WIFI list.

Figure 3:
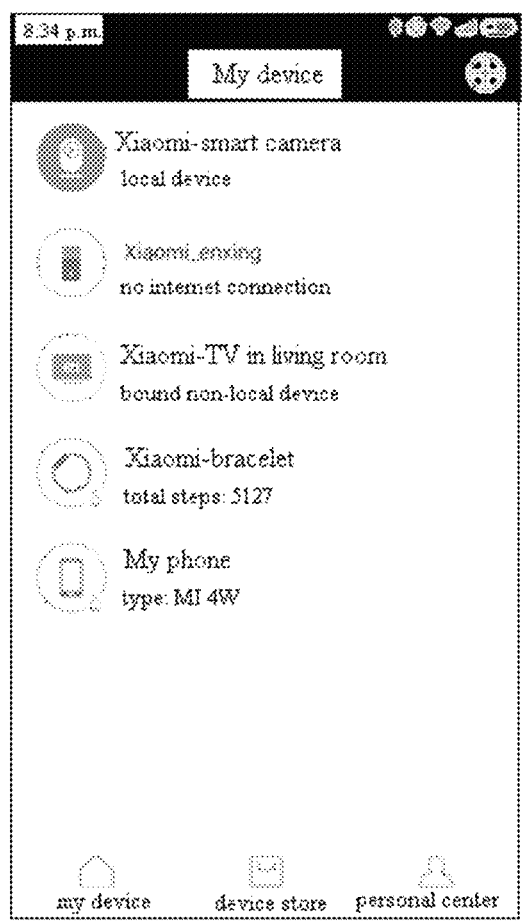
FIG. 3 is a schematic diagram showing an interface of a smart home application according to an exemplary embodiment.

In one or more embodiments, the terminal may be a smart terminal, such as a smart phone, and the WIFI smart device may be a smart home device with a built-in WIFI module. When a user controls the WIFI smart device via the smart terminal, the control is generally completed via client software installed in the smart terminal. For example, referring to FIG. 3, the client software may be a "smart home" application in practice, and the user may manage and control various smart home devices in home environment centrally via the user interface "my device" provided by the application to the user.

In the following, the technical solution of the present disclosure is described in detail by taking the smart home application as an example of the client software and with reference to a scenario of the smart home environment.

In the smart home environment, there are generally multiple smart devices. For example, in the smart home environment, there are generally smart home devices such as smart cameras, smart sockets, smart air cleaners, etc. The user may log in to the smart home application through the login account of the user, and establish a binding relationship between the smart home application and the smart devices in the home environment for determining usage permission.

However, since the smart devices in the home environment can be used normally only when they successfully access the network, it is generally required to perform a network configuration on new smart devices in the home environment for specifying the WIFI networks to be accessed by the new smart devices, before establishing the binding relationship with the new smart devices in the home environment by logging in to the smart home application through the login account of the user. After the smart devices successfully access the WIFI networks specified, the user can initiate the binding with the smart devices by operating the smart home application.

It is also possible for the user to perform the network configuration on the new smart devices in the home environment by operating the smart home application, such that the WIFI networks to be accessed are specified for the new smart devices.

In an initial state, the smart device, after being powered on, generally may send a WIFI broadcast message carrying a name of the smart device to surrounding environment via the built-in WIFI module, such that the smart home application may scan for the surrounding smart devices by receiving the broadcast message. Meanwhile, the smart device may include the WIFI types supported by itself or the WIFI types unsupported by itself in the WIFI broadcast message, such that when the smart home application receives the WIFI broadcast message, it may store the WIFI types supported by the smart device or the WIFI types unsupported by the smart device locally.

Certainly, in practice, the smart home application may implement scanning for the smart devices via the built-in Bluetooth module. For example, after being powered on, the smart device broadcasts the Bluetooth signal to surrounding environment via the built-in Bluetooth module, and the smart home application may scan for the surrounding smart device by detecting the Bluetooth signal sent by the smart device. Meanwhile, the Bluetooth signal sent by the smart device may also carry the WIFI types supported by the smart device or the WIFI types unsupported by the smart device, such that when the smart home application detects the Bluetooth signal, it may store the WIFI types supported by the smart device or the WIFI types unsupported by the smart device locally.

It should be noted that, the WIFI types supported by the smart device or the WIFI types unsupported by the smart deice depend on the standard of the WIFI smart chip used by the smart device. For example, if the WIFI smart chip used by the smart device cannot access the WIFI network which does not support the WEP encryption, the enterprise-level WIFI network (router), and the WIFI network running in the 5G frequency band, due to the standard limitation, then these types of WIFI networks unsupported by the smart device are written into a register of the WIFI smart device when the smart device leaves the factory. Thus, after being powered on, the smart device may read the compatibility information from the register and carries the compatibility information in the WIFI broadcast message or the Bluetooth signal sent for broadcasting in the home environment.

In one or more embodiments, in order to make the smart home application obtain the WIFI types supported by the smart device, the smart device actively sends the WIFI types supported by itself or the WIFI types unsupported by itself to the smart home application via the broadcast message after being powered on. Besides, the smart home application may perform an active query. For example, in practice, the smart home application may send a query message to the surrounding smart device for querying the WIFI types supported by the surrounding smart device, and when the surrounding smart device receives the query message, it may read the supported WIFI types or the unsupported WIFI types from the register of the WIFI smart chip and return the read information to the smart home application as a query result.

In practice, the query message may be the WIFI broadcast message sent by the smart home application via the user's smart terminal, or may be the Bluetooth signal sent by the user's smart terminal, which is not limited herein.

In one or more embodiments, for the scanned smart device, if it is scanned for the first time, then it indicates that the smart device is a new smart device, and since the smart device has not yet accessed the network, the user may perform the network configuration on the smart device by operating the smart home application for specifying the WIFI network to be accessed for the smart device.

In practice, when one new smart device is scanned by the smart home application for the first time, a prompt box "one smart device is found, and click for connecting with the new device" may be output in an interface of the application. When the user clicks an OK button in the prompt box, it jumps to a device connection interface.

Figure 4:
FIG. 4 is a schematic diagram showing an interface of another smart home application according to an exemplary embodiment.

For example, referring to FIG. 4, if one new air cleaner is scanned by the smart home application, the prompt box "one air cleaner is found, click for connecting with the new device" is outputted in the interface of the application. When the user clicks the OK button at the bottom of the prompt box, it can jump to the device connection interface.

Certainly, if multiple new smart devices are scanned by the smart home application, a device list may be generated according to the scanned smart devices, and then the user may select in the list the smart device on which the network configuration is to be performed, such that the device connection interface is jumped to.

Figure 5:
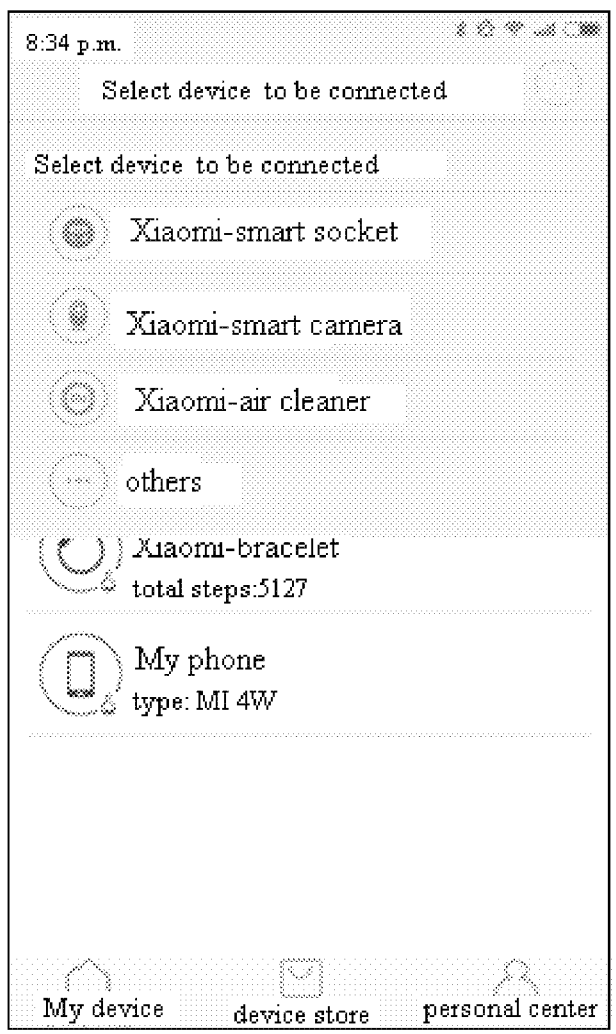
FIG. 5 is a schematic diagram showing an interface of another smart home application according to an exemplary embodiment.

For example, referring to FIG. 5, if multiple new smart devices such as "XiaoMi-smart socket", "XiaoMi-smart camera", and "XiaoMi-air cleaner" are scanned by the smart home application, a device list of "select device to be connected" may be outputted in the interface of the smart home application for the user, such that the user may select in the list the smart device on which the network configuration is to be performed, and device connection interface may be jumped to.

In the device connection interface, a drop-down list displaying the WIFI networks to be accessed by the smart device may be provided, and the user may specify the WIFI network to be accessed (i.e. SSID) for the smart device in the drop-down list.

Figure 6:
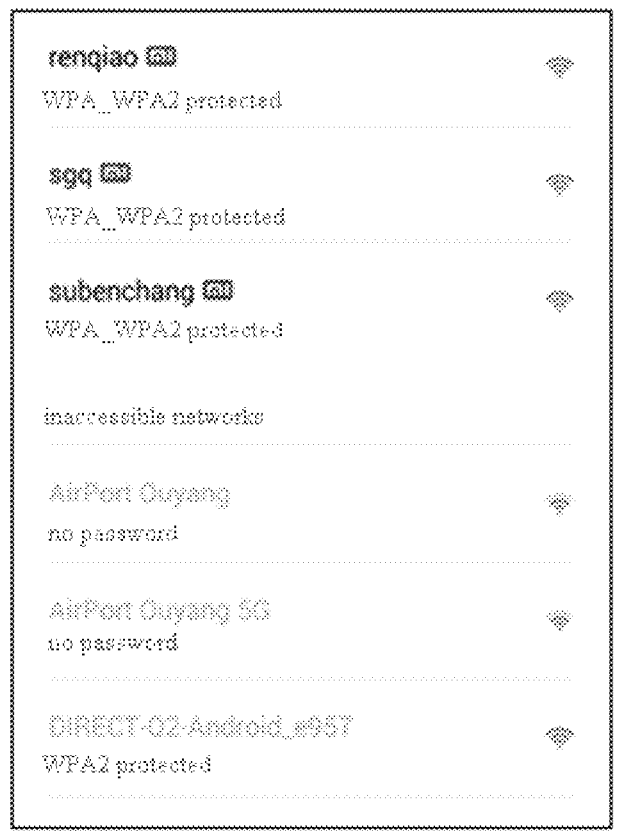
FIG. 6 is a schematic diagram showing an interface of another smart home application according to an exemplary embodiment.

For example, referring to FIG. 6, when the user selects from the device list shown in FIG. 5 the smart device on which the network configuration is to be performed, a drop-down list containing WIFI networks accessible to the smart device may be displayed in the device connection interface, such that the user may specify the WIFI network to be accessed for the smart device in the drop-down list.

In one or more embodiments, since the smart home application has stored the supported WIFI types or the unsupported WIFI types of all the scanned smart devices locally, the smart home application may classify the WIFI networks to be accessed by the smart device in the drop-down list according to the above information in combination with the practical situation of the WIFI network in the home environment.

The smart home application may classify the WIFI networks in the drop-down list based on an accessible group and an inaccessible group, and classify the WIFI networks in the drop-down list as the WIFI networks accessible to the smart device and the WIFI networks inaccessible to the smart device.

In practice, the smart home application may scan for the surrounding WIFI networks, and obtain the types of the scanned WIFI networks. For example, the smart home application may obtain information such as the frequency band of the scanned WIFI network, whether the scanned WIFI network supports the WEP encryption, whether the WIFI network is the enterprise-level router, etc.

After obtaining the types of the scanned WIFI networks, the smart home application may match the types with the WIFI types supported by the smart device stored locally or with the WIFI types unsupported by the smart device stored locally. If the type of a scanned WIFI network matches with the WIFI types supported by the smart device, the WIFI network may be classified as the WIFI network accessible to the smart device. Similarly, if the type of a scanned WIFI network does not match with the WIFI types supported by the smart device or matches with the WIFI types unsupported by the smart device, the WIFI network may be classified as the WIFI network inaccessible to the smart device.

For example, if the WIFI types unsupported by the smart device includes the WIFI network which does not support the WEP encryption, the enterprise-level WIFI network (router) and the WIFI network running in the 5G frequency band, and the WIFI network scanned by the smart home application is running in the 5G frequency band, then the WIFI network may be classified as the WIFI network inaccessible to the smart device locally. Similarly, if the type of the scanned WIFI network does not match with any of the WIFI types unsupported by the smart device, then the WIFI network may be classified locally as the WIFI network accessible to the smart device.

In one or more embodiments, since the user only focuses on the WIFI networks accessible to the smart device when specifying the WIFI network to be accessed for the smart device in the drop-down list, the smart home application may mark the WIFI networks determined to be accessible to the smart device in the above matching process when classifying the WIFI networks in the drop-down list. When marking the WIFI networks in the drop-down list, the smart home application may add a special marker to the WIFI network determined to be accessible to the smart device, for example, add the logo of Xiaomi company to the WIFI network determined to be accessible to the smart device, as shown in the WIFI list of FIG. 6. Certainly, besides adding a special marker, the name of the WIFI network determined to accessible to the smart device may be highlighted, such that the WIFI networks accessible to the smart device are distinguished from the WIFI networks inaccessible to the smart device.

In addition, in order to make the classified WIFI networks in the drop-down list more intuitive, the WIFI networks determined to be accessible to the smart device may be ranked according to a predetermined arrangement and then displayed in the drop-down list in sequence from a beginning of the drop-down list. For example, the WIFI networks accessible to the smart device may be ranked in alphabetical order according to initials of the names of the WIFI networks, and then the ranked WIFI networks accessible to the smart device are displayed to the user from the beginning of the drop-down list. In this way, when the user specifies the WIFI network to be accessed for the smart device, he/she can give priority to the WIFI networks marked as accessible in the list for the smart device, such that the access failure caused by specifying the inaccessible WIFI network for the WIFI smart device may be avoided, and the rate of successful accesses of the WIFI smart device may be enhanced.

Figure 7:
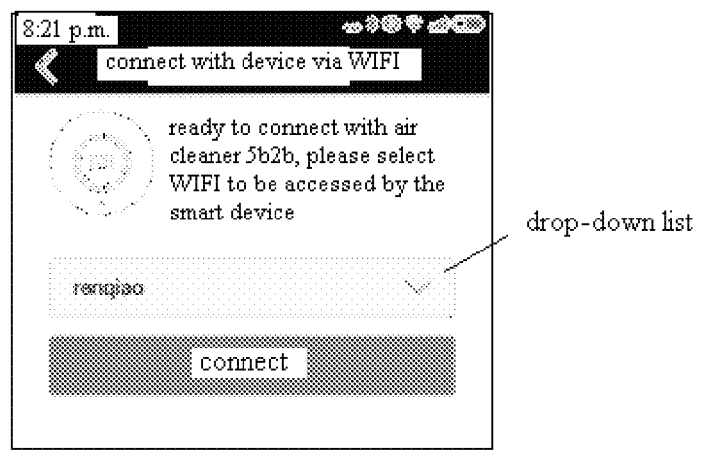
FIG. 7 is a schematic diagram showing an interface of another smart home application according to an exemplary embodiment.

In one or more embodiments, a connection button may be provided in the device connection interface. When the user has already specified the WIFI network for the smart device via the drop-down list, the smart home application may push the name and password of the WIFI network stored in the background to the smart device after the user clicks the connection button. After receiving the WIFI name and password pushed by the smart home application, the smart device may initiate a connection to a corresponding wireless router according to the received name and password of the WIFI network. For example, referring to FIG. 7, if the user specifies the WIFI network named after renqiao for the smart device, the user may click the connection button after specifying, such that the smart home application is triggered to push the name and password of the WIFI network to the smart device.

Certainly, if the smart home application does not store the password of the WIFI network in the background, an input box may be outputted in the device connection interface, such that the user may input the WIFI password manually, and the smart home application may push the name of the WIFI network and the WIFI password input by the user to the smart device.

Corresponding to the above method embodiments, the present disclosure also provides a device for displaying a WIFI list.

Figure 8:
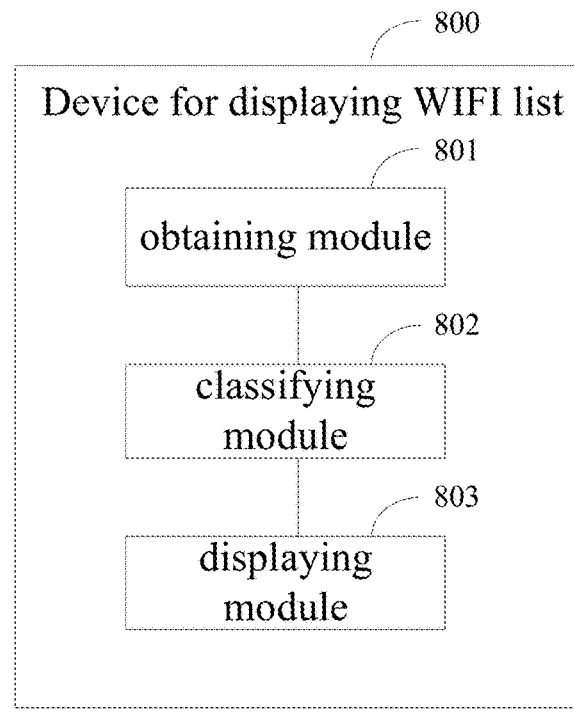
FIG. 8 is a block diagram of a device for displaying a WIFI list according to an exemplary embodiment.

FIG. 8 is a block diagram of a device for displaying a WIFI list according to an exemplary embodiment.

As shown in FIG. 8, the device 800 for displaying a WIFI list according to an exemplary embodiment includes an obtaining module 801, a classifying module 802 and a displaying module 803.

The obtaining module 801 is configured to obtain WIFI types supported by a WIFI smart device.

The classifying module 802 is configured to classify WIFI networks to be accessed by the WIFI smart device into at least an accessible group and an inaccessible group according to the WIFI types supported by the WIFI smart device.

The displaying module 803 is configured to display in the WIFI list the WIFI networks classified.

Figure 9:
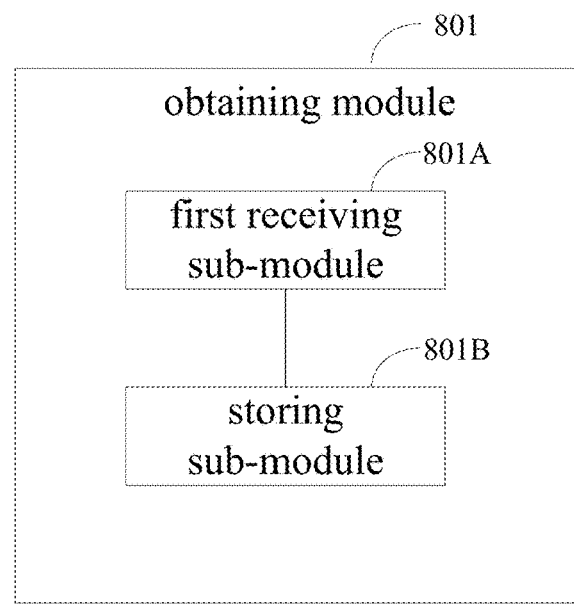
FIG. 9 is a block diagram of another device for displaying a WIFI list according to an exemplary embodiment.

Referring to FIG. 9, which is a block diagram of another device for displaying a WIFI list according to an exemplary embodiment, the obtaining module 801 may include a first receiving sub-module 801A and a storing sub-module 801B, based on the embodiment shown in FIG. 8.

The first receiving sub-module 801A is configured to receive a broadcast message sent by the WIFI smart device, in which the broadcast message is sent by the WIFI smart device when being started, and the broadcast message carries the WIFI types supported by the WIFI smart device or the WIFI types unsupported by the WIFI smart device.

The storing sub-module 801B is configured to store the WIFI types supported by the WIFI smart device or the WIFI types unsupported by the WIFI smart device locally.

Figure 10:
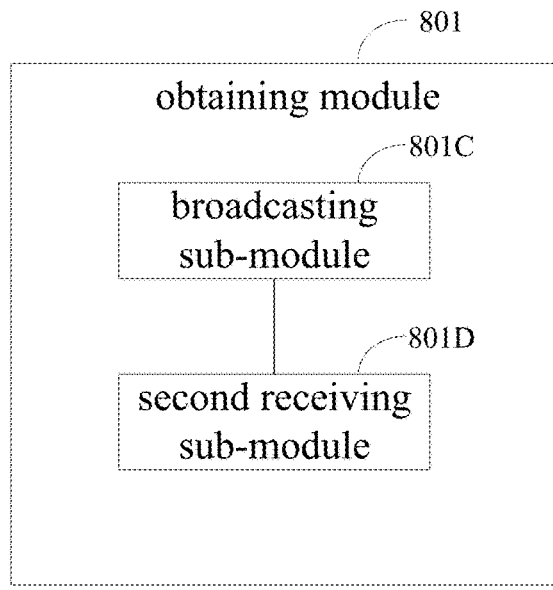
FIG. 10 is a block diagram of another device for displaying a WIFI list according to an exemplary embodiment.

Referring to FIG. 10, which is a block diagram of another device for displaying a WIFI list according to an exemplary embodiment, the obtaining module 801 may include a broadcasting sub-module 801C and a second receiving sub-module 801D, based on the embodiment shown in FIG. 8.

The broadcasting sub-module 801C is configured to broadcast a query message to the WIFI smart device, in which the query message is configured to query the WIFI types supported by the WIFI smart device.

The second receiving sub-module 801D is configured to receive a query result returned by the WIFI smart device in response to the query message, in which the query result comprises the WIFI types supported by the WIFI smart device or the WIFI types unsupported by the WIFI smart device.

It should be noted that, the broadcasting sub-module 801C and the second receiving sub-module 801D shown in the device embodiment of FIG. 10 may also be included in the device embodiment of FIG. 9, which is not limited herein.

Figure 11:
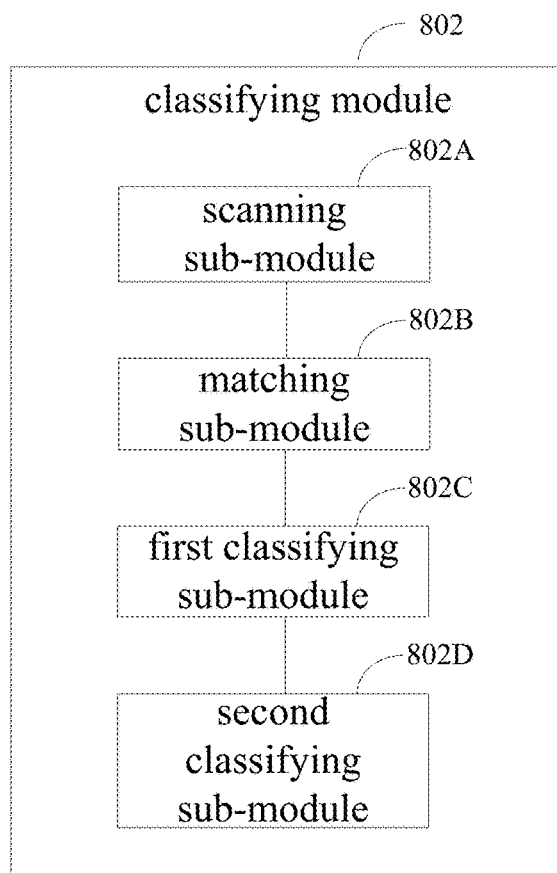
FIG. 11 is a block diagram of another device for displaying a WIFI list according to an exemplary embodiment.

Referring to FIG. 11, which is a block diagram of another device for displaying a WIFI list according to an exemplary embodiment, the classifying module 802 may include a scanning sub-module 802A, a matching sub-module 802B, a first classifying sub-module 802C and a second classifying sub-module 802D, based on the embodiment shown in FIG. 8.

The scanning sub-module 802A is configured to scan for surrounding WIFI networks, and obtain types of the surrounding WIFI networks.

The matching sub-module 802B is configured to match the types of the surrounding WIFI networks with the WIFI types supported by the WIFI smart device stored locally or with the WIFI types unsupported by the WIFI smart device stored locally.

The first classifying sub-module 802C is configured to classify a WIFI network as a WIFI network accessible to the WIFI smart device if the type of the WIFI network matches with the WIFI types supported by the WIFI smart device.

The second classifying sub-module 802D is configured to classify a WIFI network as a WIFI network inaccessible to the WIFI smart device if the type of the WIFI network does not match with the WIFI types supported by the WIFI smart device or matches with the WIFI types unsupported by the WIFI smart device.

It should be noted that, the scanning sub-module 802A, the matching sub-module 802B, the first classifying sub-module 802C and the second classifying sub-module 802D shown in the device embodiment of FIG. 11 may also be included in the device embodiments shown in FIGS. 9-10, which is not limited herein.

Figure 12:
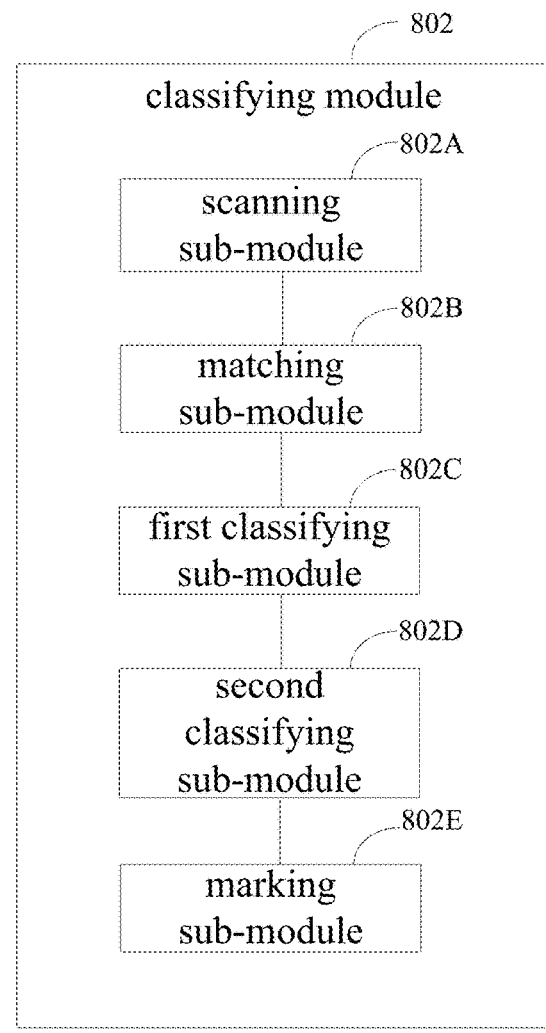
FIG. 12 is a block diagram of another device for displaying a WIFI list according to an exemplary embodiment.

Referring to FIG. 12, which is a block diagram of another device for displaying a WIFI list according to an exemplary embodiment, the classifying module 802 may include a marking sub-module 802E, based on the embodiment shown in FIG. 11.

The marking sub-module 802E is configured to mark the WIFI network accessible to the WIFI smart device as accessible in the WIFI list; or highlight a name of the WIFI network accessible to the WIFI smart device in the WIFI list.

It should be noted that, the marking sub-module 802E shown in the device embodiment of FIG. 12 may also be included in the device embodiments shown in FIGS. 8-10, which is not limited herein.

Figure 13:
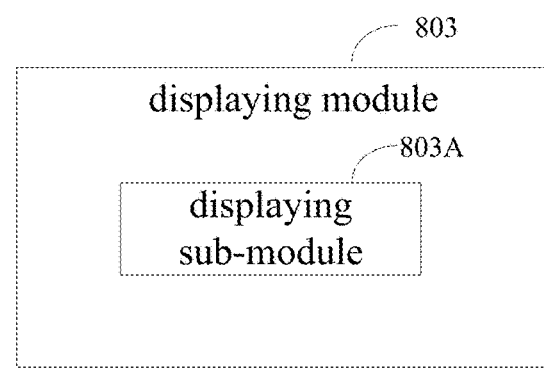
FIG. 13 is a block diagram of another device for displaying a WIFI list according to an exemplary embodiment.

Referring to FIG. 13, which is a block diagram of another device for displaying a WIFI list according to an exemplary embodiment, the displaying module 803 may include a displaying sub-module 803A, based on the embodiment shown in FIG. 8.

The displaying sub-module 803A is configured to display in the WIFI list the WIFI networks marked as accessible or with highlighted names in sequence from a beginning of the WIFI list according to a predetermined arrangement.

It should be noted that the displaying sub-module 803A shown in the device embodiment of FIG. 13 may also be included in the device embodiments of FIGS. 9-12, which is not limited herein.

With respect to the devices in the above embodiments, the specific operation modes of individual modules therein have been described in detail in the embodiments regarding the methods for displaying the WIFI list, which will not be elaborated herein.

Since the device embodiments are substantially corresponding to the method embodiments, the related aspects may be referred to the description in the method embodiments. The device embodiments described above are only exemplary, and modules illustrated as separate components therein may be or may not be physically separated from each other, and components represented as modules may be or may not be physical modules, i.e., may be located in a same place or may be distributed in multiple network units. Some or all of the modules may be selected according to the actual requirements so as to achieve objectives of the present disclosure, which may be understood or implemented by those skilled in the art without creative work.

Accordingly, the present disclosure also provides a device for displaying a WIFI list, and the device includes a processor, and a memory configured to store instructions executable by the processor. The processor is configured to obtain WIFI types supported by a WIFI smart device, classify WIFI networks to be accessed by the WIFI smart device into at least an accessible group and an inaccessible group according to the WIFI types supported by the WIFI smart device, and display in the WIFI list the WIFI networks classified.

Accordingly, the present disclosure also provides a terminal. The terminal includes a memory, and one or more programs stored in the memory. The one or more programs are configured to be executed by one or more processor, and the one or more programs include instructions for implementing following operations: obtaining WIFI types supported by a WIFI smart device; classifying WIFI networks to be accessed by the WIFI smart device into at least an accessible group and an inaccessible group according to the WIFI types supported by the WIFI smart device; displaying in the WIFI list the WIFI networks classified.

Figure 14:
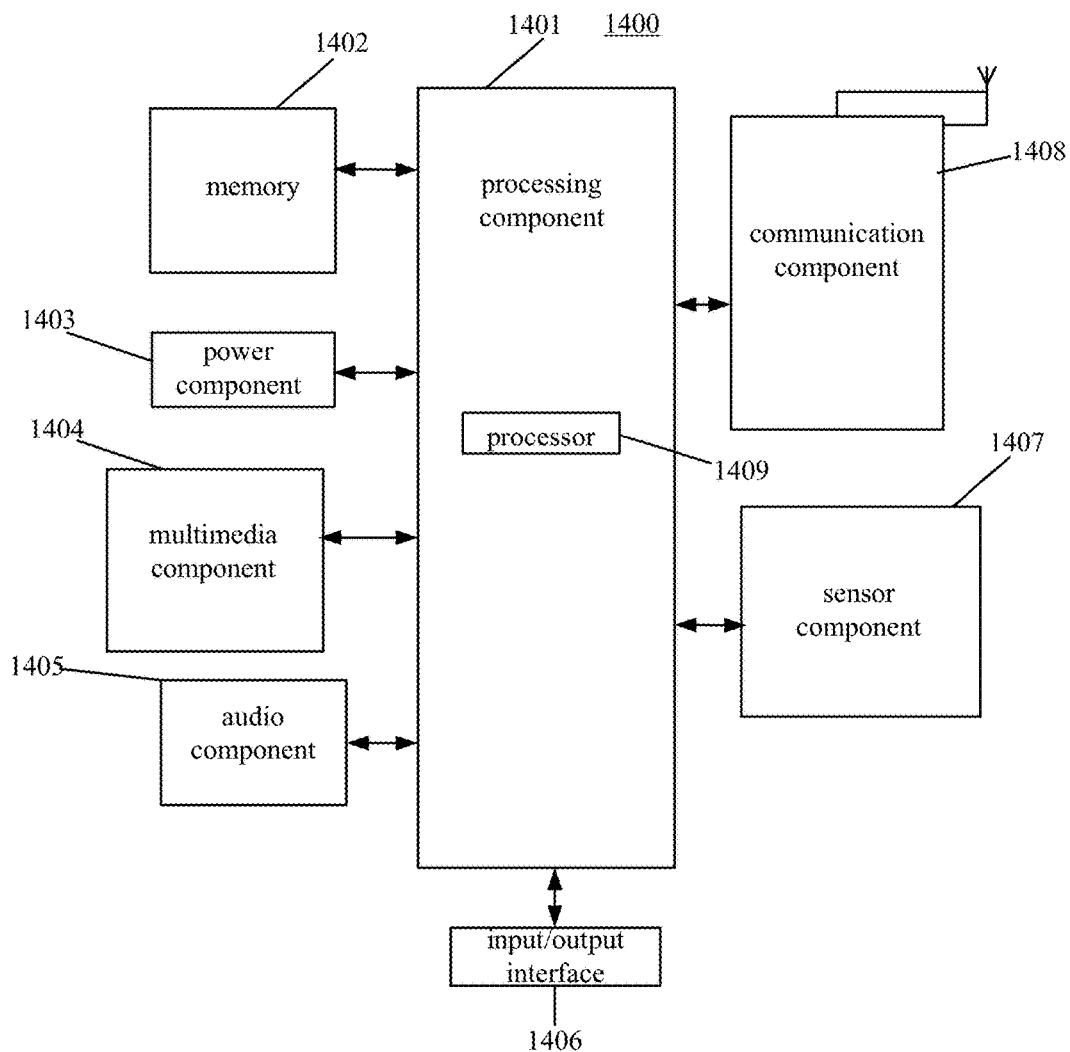
FIG. 14 is a schematic diagram of a device for displaying a WIFI list according to an exemplary embodiment.

FIG. 14 is a schematic diagram of a device for displaying a WIFI list according to an exemplary embodiment of the present disclosure.

As shown in FIG. 14, the device 1400 for displaying a WIFI list according to an exemplary embodiment may be a mobile phone, a computer, a digital broadcast terminal, a message transceiver, a game console, a tablet, a medical device, an exercise equipment, a personal digital assistant, and the like.

Referring to FIG. 14, the device 1400 may include one or more of the following components: a processing component 1401, a memory 1402, a power component 1403, a multimedia component 1404, an audio component 1405, an input/output (I/O) interface 1406, a sensor component 1407, and a communication component 1408.

The processing component 1401 typically controls overall operations of the device 1400, such as the operations associated with display, telephone calls, data communications, camera operations, and recording operations. The processing component 1401 may include one or more processors 1409 to execute instructions to perform all or part of the steps in the above described methods. Moreover, the processing component 1401 may include one or more modules which facilitate the interaction between the processing component 1401 and other components. For instance, the processing component 1401 may include a multimedia module to facilitate the interaction between the multimedia component 1404 and the processing component 1401.

The memory 1402 is configured to store various types of data to support the operation of the device 1400. Examples of such data include instructions for any applications or methods operated on the device 1400, contact data, phonebook data, messages, pictures, video, etc. The memory 1402 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1403 provides power to various components of the device 1400. The power component 1403 may include a power management system, one or more power sources, and any other components associated with the generation, management, and distribution of power in the device 1400.

The multimedia component 1404 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1404 includes a front camera and/or a rear camera. The front camera and the rear camera may receive external multimedia data while the device 1400 is in an operation mode, such as a photographing mode or a video mode. Each of the front camera and the rear camera may be a fixed optical lens system or have focus and optical zoom capability.

The audio component 1405 is configured to output and/or input audio signals. For example, the audio component 1405 includes a microphone (MIC) configured to receive an external audio signal when the device 1400 is in an operation mode, such as a call mode, a recording mode, and a voice recognition mode. The received audio signal may be further stored in the memory 1402 or transmitted via the communication component 1408. In some embodiments, the audio component 1405 further includes a speaker to output audio signals.

The I/O interface 1402 provides an interface between the processing component 1401 and peripheral interface modules, such as a keyboard, a click wheel, buttons, and the like. The buttons may include, but are not limited to, a home button, a volume button, a starting button, and a locking button.

The sensor component 1407 includes one or more sensors to provide status assessments of various aspects of the device 1400. For instance, the sensor component 1407 may detect an open/closed status of the device 1400 and relative positioning of components (e.g., the display and the keypad of the device 1400). The sensor component 1407 may also detect a change in position of the device 1400 or of a component in the device 1400, a presence or absence of user contact with the device 1400, an orientation or an acceleration/deceleration of the device 1400, and a change in temperature of the device 1400. The sensor component 1407 may include a proximity sensor configured to detect the presence of nearby objects without any physical contact. The sensor component 1407 may also include a light sensor, such as a CMOS or CCD image sensor, for use in imaging applications. In some embodiments, the sensor component 1407 may also include an accelerometer sensor, a gyroscope sensor, a magnetic sensor, a pressure sensor, or a temperature sensor.

The communication component 1408 is configured to facilitate wired or wireless communication between the device 1400 and other devices. The device 1400 can access a wireless network based on a communication standard, such as WIFI, 2G, or 3G, or a combination thereof. In one exemplary embodiment, the communication component 1408 receives a broadcast signal or broadcast associated information from an external broadcast management system via a broadcast channel. In one exemplary embodiment, the communication component 1408 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with processing circuitry including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module or sub-module discussed above, such as the obtaining module 801, the classifying module 802, and the displaying module 803, may take the form of a packaged functional hardware unit designed for use with other components, a portion of a program code (e.g., software or firmware) executable by the processor 1409 or the processing circuitry that usually performs a particular function of related functions, or a self-contained hardware or software component that interfaces with a larger system, for example.

In exemplary embodiments, there is also provided a non-transitory computer-readable storage medium including instructions, such as the memory 1402 including instructions. The above instructions are executable by the processor 1409 in the device 1400, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor of the mobile terminal, the mobile terminal can implement a method for displaying a WIFI list, including: obtaining WIFI types supported by a WIFI smart device; classifying WIFI networks to be accessed by the WIFI smart device into at least an accessible group and an inaccessible group according to the WIFI types supported by the WIFI smart device; displaying in the WIFI list the WIFI networks classified.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying a WIFI list, comprising:
obtaining, by a terminal comprising a processor, WIFI types supported by a WIFI smart device, wherein the WIFI types supported by the WIFI smart device depend on a WIFI smart chip used by the WIFI smart device;
classifying, by the terminal, WIFI networks to be accessed by the WIFI smart device into at least an accessible group and an inaccessible group according to the WIFI types supported by the WIFI smart device; and
displaying, by the terminal, in the WIFI list the WIFI networks classified with an indication of one of the accessible group and the inaccessible group;
wherein classifying WIFI networks to be accessed by the WIFI smart device into at least the accessible group and the inaccessible group according to the WIFI types supported by the WIFI smart device comprises:
scanning for surrounding WIFI networks, and obtaining types of the surrounding WIFI networks;
matching the types of the surrounding WIFI networks with the WIFI types supported by the WIFI smart device stored locally or with WIFI types unsupported by the WIFI smart device stored locally, wherein the WIFI types unsupported by the WIFI smart device depend on the WIFI smart chip used by the WIFI smart device;
when the type of a WIFI network matches with the WIFI types supported by the WIFI smart device, classifying the WIFI network as an accessible WIFI network in the accessible group; and when the type of the WIFI network does not match with the WIFI types supported by the WIFI smart device or matches with the WIFI types unsupported by the WIFI smart device, classifying the WIFI network as an inaccessible WIFI network in the inaccessible group.

2. The method according to claim 1, wherein obtaining WIFI types supported by a WIFI smart device comprises:
receiving a broadcast message sent by the WIFI smart device, wherein the broadcast message is sent by the WIFI smart device when being started, and the broadcast message carries the WIFI types supported by the WIFI smart device or the WIFI types unsupported by the WIFI smart device; and
storing the WIFI types supported by the WIFI smart device or the WIFI types unsupported by the WIFI smart device locally.

3. The method according to claim 1, wherein obtaining WIFI types supported by a WIFI smart device comprises:
broadcasting a query message to the WIFI smart device, wherein the query message is configured to query the WIFI types supported by the WIFI smart device; and
receiving a query result returned by the WIFI smart device in response to the query message, wherein the query result comprises the WIFI types supported by the WIFI smart device or the WIFI types unsupported by the WIFI smart device.

4. The method according to claim 1, further comprising:
marking the WIFI network accessible to the WIFI smart device as accessible in the WIFI list.

5. The method according to claim 1, further comprising:
highlighting a name of the WIFI network accessible to the WIFI smart device in the WIFI list.

6. The method according to claim 5, wherein displaying in the WIFI list the WIFI networks classified comprises:
displaying, in the WIFI list, the WIFI networks marked as accessible or with highlighted names in sequence from a beginning of the WIFI list according to a predetermined arrangement.

7. The method according to claim 1, further comprising:
displaying, by the terminal, each of the WIFI networks classified with an indication of one of the accessible group and the inaccessible group.

8. The method according to claim 1, further comprising:
displaying, by the terminal, an accessible WIFI network with a company logo indicating a manufacturer of a router providing the accessible WIFI network.

9. A device for displaying a WIFI list, comprising:
a processor;
a memory configured to store instructions executable by the processor;
wherein the processor is configured to:
obtain WIFI types supported by a WIFI smart device, wherein the WIFI types supported by the WIFI smart device depend on a WIFI smart chip used by the WIFI smart device;
classify WIFI networks to be accessed by the WIFI smart device into at least an accessible group and an inaccessible group according to the WIFI types supported by the WIFI smart device; and
display in the WIFI list the WIFI networks classified;
wherein the processor is configured to classify WIFI networks to be accessed by the WIFI smart device into at least the accessible group and the inaccessible group according to the WIFI types supported by the WIFI smart device by:
scanning for surrounding WIFI networks, and obtaining types of the surrounding WIFI networks;
matching the types of the surrounding WIFI networks with the WIFI types supported by the WIFI smart device stored locally or with the WIFI types unsupported by the WIFI smart device stored locally, wherein the WIFI types unsupported by the WIFI smart device depend on the WIFI smart chip used by the WIFI smart device;
when the type of a WIFI network matches with the WIFI types supported by the WIFI smart device, classifying the WIFI network as an accessible WIFI network in the accessible group; and
when the type of the WIFI network does not match with the WIFI types supported by the WIFI smart device or matches with the WIFI types unsupported by the WIFI smart device, classifying the WIFI network as an inaccessible WIFI network in the inaccessible group.

10. The device according to claim 9, wherein the processor is configured to obtain WIFI types supported by a WIFI smart device by:
receiving a broadcast message sent by the WIFI smart device, wherein the broadcast message is sent by the WIFI smart device when being started, and the broadcast message carries the WIFI types supported by the WIFI smart device or the WIFI types unsupported by the WIFI smart device; and
storing the WIFI types supported by the WIFI smart device or the WIFI types unsupported by the WIFI smart device locally.

11. The device according to claim 9, wherein the processor is configured to obtain WIFI types supported by a WIFI smart device by:
broadcasting a query message to the WIFI smart device, wherein the query message is configured to query the WIFI types supported by the WIFI smart device; and
receiving a query result returned by the WIFI smart device in response to the query message, wherein the query result comprises the WIFI types supported by the WIFI smart device or the WIFI types unsupported by the WIFI smart device.

12. The device according to claim 8, wherein the processor is further configured to:
mark the WIFI network accessible to the WIFI smart device as accessible in the WIFI list.

13. The device according to claim 8, wherein the processor is further configured to:
highlight a name of the WIFI network accessible to the WIFI smart device in the WIFI list.

14. The device according to claim 13, wherein the processor is configured to display in the WIFI list the WIFI networks classified by:
displaying, in the WIFI list, the WIFI networks marked as accessible or with highlighted names in sequence from a beginning of the WIFI list according to a predetermined arrangement.

15. A non-transitory computer-readable storage medium having stored therein instructions that, when executed by a processor of a terminal device, causes the terminal device to perform acts comprising:
obtaining WIFI types supported by a WIFI smart device, wherein the WIFI types supported by the WIFI smart device depend on a WIFI smart chip used by the WIFI smart device;
classifying WIFI networks to be accessed by the WIFI smart device into at least an accessible group and an inaccessible group according to the WIFI types supported by the WIFI smart device;
displaying in a WIFI list the WIFI networks classified;

wherein the acts further comprises:
  scanning for surrounding WIFI networks, and obtaining types of the surrounding WIFI networks;
  matching the types of the surrounding WIFI networks with the WIFI types supported by the WIFI smart device stored locally or with the WIFI types unsupported by the WIFI smart device stored locally, wherein the WIFI types unsupported by the WIFI smart device depend on the WIFI smart chip used by the WIFI smart device;
  when the type of a WIFI network matches with the WIFI types supported by the WIFI smart device, classifying the WIFI network as an accessible WIFI network in the accessible group; and
  when the type of the WIFI network does not match with the WIFI types supported by the WIFI smart device or matches with the WIFI types unsupported by the WIFI smart device, classifying the WIFI network as an inaccessible WIFI network in the inaccessible group.

16. The device according to claim 15, wherein the acts further comprise:
  receiving a broadcast message sent by the WIFI smart device, wherein the broadcast message is sent by the WIFI smart device when being started, and the broadcast message carries the WIFI types supported by the WIFI smart device or the WIFI types unsupported by the WIFI smart device; and
  storing the WIFI types supported by the WIFI smart device or the WIFI types unsupported by the WIFI smart device locally.

17. The device according to claim 15, wherein the acts further comprise:
  broadcasting a query message to the WIFI smart device, wherein the query message is configured to query the WIFI types supported by the WIFI smart device; and
  receiving a query result returned by the WIFI smart device in response to the query message, wherein the query result comprises the WIFI types supported by the WIFI smart device or the WIFI types unsupported by the WIFI smart device.

18. The device according to claim 15, wherein the acts further comprise:
  marking the WIFI network accessible to the WIFI smart device as accessible in the WIFI list.

19. The device according to claim 15, wherein the acts further comprise:
  highlighting a name of the WIFI network accessible to the WIFI smart device in the WIFI list; and
  displaying, in the WIFI list, the WIFI networks marked as accessible or with highlighted names in sequence from a beginning of the WIFI list according to a predetermined arrangement.

* * * * *